US008266685B2

(12) United States Patent
Abzarian et al.

(10) Patent No.: US 8,266,685 B2
(45) Date of Patent: Sep. 11, 2012

(54) FIREWALL INSTALLER (75) Inventors: David Abzarian, Kirkland, WA (US); Eran Yariv, Redmond, WA (US); Emanuel Paleologu, Kirkland, WA (US); Gerardo Diaz Cuellar, Redmond, WA (US); Ian Carbaugh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1018 days.

(21) Appl. No.: 11/804,409

(22) Filed: May 18, 2007

(65) Prior Publication Data

US 2008/0289026 A1 Nov. 20, 2008

(51) Int. Cl.
H04L 29/06 (2006.01)

(52) U.S. Cl. ............ 726/11; 726/2; 726/3; 726/12; 726/14; 713/153; 713/150; 709/222; 709/220; 709/221; 709/227; 709/238; 370/401; 370/351

(58) Field of Classification Search .................. None
See application file for complete search history.

(56) References Cited

U.S. PATENT DOCUMENTS

| | | | |
|---|---|---|---|
| 6,550,012 B1 | 4/2003 | Villa et al. | |
| 6,721,890 B1 * | 4/2004 | Shrikhande | 726/14 |
| 6,917,980 B1 * | 7/2005 | Gusler et al. | 709/229 |
| 7,284,267 B1 * | 10/2007 | McArdle et al. | 726/11 |
| 7,308,706 B2 * | 12/2007 | Markham et al. | 726/4 |
| 7,603,333 B2 * | 10/2009 | Finkelstein et al. | 706/48 |
| 7,639,714 B2 * | 12/2009 | Stolfo et al. | 370/474 |
| 7,877,795 B2 * | 1/2011 | Aaron | 726/11 |
| 7,886,340 B2 * | 2/2011 | Carley | 726/3 |
| 7,941,838 B2 * | 5/2011 | Diaz Cuellar et al. | 726/11 |
| 7,954,143 B2 * | 5/2011 | Aaron | 726/11 |
| 7,979,368 B2 * | 7/2011 | Kapoor et al. | 706/20 |
| 8,024,482 B2 * | 9/2011 | Hoogerwerf et al. | 709/246 |
| 8,099,774 B2 * | 1/2012 | Abzarian et al. | 726/11 |
| 8,151,337 B2 * | 4/2012 | Crowell et al. | 726/11 |
| 8,166,534 B2 * | 4/2012 | Yariv et al. | 726/11 |
| 2003/0084322 A1 | 5/2003 | Schertz et al. | |
| 2003/0084348 A1 | 5/2003 | Miyao et al. | |
| 2003/0172109 A1 | 9/2003 | Dalton et al. | |
| 2004/0054610 A1 * | 3/2004 | Amstutz et al. | 705/36 |
| 2004/0111643 A1 * | 6/2004 | Farmer | 713/201 |
| 2005/0246522 A1 | 11/2005 | Samuelsson et al. | |
| 2005/0262554 A1 * | 11/2005 | Brooks et al. | 726/11 |
| 2005/0268331 A1 * | 12/2005 | Le et al. | 726/11 |

(Continued)

OTHER PUBLICATIONS

Solaris 10 Operating System and Security—Advanced Features Enable Secure Systems, downloaded from http://www.sun.com/software/solaris/ds/security.jsp#3, 3 pages, 2006.
Linux Firewall—the Traffic Shaper, downloaded from http://www.securityfocus.com/infocus/1285, dated Jan. 15, 2001, 3 pages, 2006.
Juniper Networks Integrated Firewall/VPN Solutions, downloaded from http://www.juniper.net/solutions/literature/brochures/150024.pdf; Aug. 2006, 8 pages.

(Continued)

*Primary Examiner* — Syed A. Zia (57) ABSTRACT

Embodiments of the invention are directed to a firewall installer that receives a set of configuration instructions for configuring a firewall in a declarative format that describes one or more rules to be implemented by the firewall, and that automatically configures the firewall. Providing a firewall installer that is capable of configuring a firewall based upon declarative input rather than procedural process-oriented input facilitates administration of a firewall by allowing an administrator to specify desired firewall configuration at a higher, declarative level and frees the administrator from the need to specify procedures for implementing configuration changes in the firewall. In one embodiment of the invention, the firewall installer can receive and store input for configuring a firewall even when the firewall is not running, such that the firewall executes on those configuration changes when it next comes online.

18 Claims, 8 Drawing Sheets

U.S. PATENT DOCUMENTS

| | | | |
|---|---|---|---|
| 2007/0204338 A1* | 8/2007 | Aiello et al. | 726/11 |
| 2008/0148380 A1* | 6/2008 | Abzarian et al. | 726/11 |
| 2009/0083727 A1* | 3/2009 | Fu et al. | 717/172 |
| 2009/0150977 A1* | 6/2009 | Carley | 726/3 |
| 2010/0107172 A1* | 4/2010 | Calinescu et al. | 718/104 |
| 2010/0180331 A1* | 7/2010 | Murakami et al. | 726/11 |
| 2011/0047597 A1* | 2/2011 | Mahaffey et al. | 726/3 |
| 2011/0219444 A1* | 9/2011 | Turley et al. | 726/13 |

OTHER PUBLICATIONS

Cisco Firewall Service Module—Security appliance—spare—plug-in module; downloaded from http://www.amazon.co.uk/Cisco-Firewall-Service-Module-plug/dp/B00008RUL5; 3 pages, 2006.

Nedgty: Web services firewall; downloaded from http://ieeexplore.ieee.org/Xplore/login.jsp?url=/ie15/10245/32665/01530851.pdf?arnumber=1530851; 1 page, 2006.

* cited by examiner

```
<?xml version="1.0" encoding="UTF-8"?>
<assemblyIdentity name="Microsoft-Windows-SomeOptionalComponent"/>

<firewallRule internalName="NetPres-WSD-In-UDP"
        name="@wfapi.dll,-23035" profile="All" protocol="UDP"
        dir="In" lport="3702" binary="%system32%\netproj.exe"
        active="False" group="@wfapi.dll,-23033"/>

</assembly>
```

FIREWALL INSTALLER

BACKGROUND OF INVENTION

Since the development of computer networks, security has been a concern of administrators of computers and computer networks. As a result, many different methods of securing computers have been proposed.

One such security method is a firewall. Firewalls provide for security of computers by regulating what data is allowed into and out of a single computer or a computer network. A firewall may be installed in many different places on a network, such as on a dedicated computer apparatus and placed at an entry/exit point in the network (i.e., where one computer network connects to another computer network) or on a computer to regulate communication for that computer. Based on certain parameters, data may be allowed to pass through the firewall to its destination or may be blocked by the firewall. These parameters may be based on a variety of data characteristics and are regulated by firewall rules.

SUMMARY OF INVENTION

Embodiments of the invention are directed to a firewall installer that receives a set of configuration instructions for configuring a firewall in a declarative format that describes one or more rules to be implemented by the firewall, and that automatically configures the firewall. Providing a firewall installer that is capable of configuring a firewall based upon declarative input rather than procedural process-oriented input facilitates administration of a firewall by allowing an administrator to specify desired firewall configuration at a higher, declarative level and frees the administrator from the need to specify procedures for implementing configuration changes in the firewall. In one embodiment of the invention, the firewall installer can receive and store input for configuring a firewall even when the firewall is not running, such that the firewall executes on those configuration changes when it next comes online.

In one embodiment, there is provided a method comprising receiving, at a firewall installer, configuration information. The configuration information is in a declarative form that specifies at least one a firewall rule to be enforced by a firewall. The method further comprises configuring the firewall, via a firewall installer, to implement the at least one firewall rule.

In another embodiment, there is provided a system comprising a firewall installer to configure a firewall. The firewall installer comprises at least one processor. The processor is programmed to receive, at a firewall installer, a set of configuration instructions comprising at least one configuration instruction. The set of configuration instructions is in a declarative form that specifies at least one a firewall rule to be enforced by the firewall. The processor is further programmed to configure the firewall, via the firewall installer, to implement the at least one firewall rule.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Applicants have appreciated that conventional management tools for configuring firewalls are limited to receiving a series of procedural function calls for individual tasks. In conventional firewalls, performing firewall functions such as adding, servicing (i.e., updating), or removing firewall rules typically comprise multiple firewall Application Program Interfaces (API) calls. For example, if a firewall administrator or an application executing in a computer system having a firewall wishes to create a new rule, a series of procedural API calls may be made for adding the rule, for adding each individual rule parameter to the rule, and for activating the rule. Similarly, multiple function calls may be made for other tasks such as servicing rules and removing rules.

Applicants have appreciated that this approach has multiple disadvantages. First, firewall administrators and application programmers seeking to interact with the firewall must manually determine and create procedural calls to implement changes in the firewall. This process is at least time consuming, and may be complex for those unfamiliar with firewall procedure calls.

Second, as a firewall and its firewall rules grow in complexity, traditional best practices for firewall management may become difficult to comply with because of the time required to execute the procedural calls needed to implement these best practices. For example, according to the traditional best practices, firewall rules that are no longer needed (for example, because the application that had created and exploited those firewall rules has been uninstalled from the computer system) should be removed from the firewall to reduce the firewall's "attack surface" (i.e., the amount of "openings" created in the firewall by firewall rules that allow traffic to pass). If many firewall rules have been created, each having a plurality of parameters, it may take a large number of procedural firewall API calls to remove all the rules. The time and complexity of the task may lead to its abandonment, and the firewall's attack surface may then be larger than it need be.

Third, for firewall API calls to be correctly processed, the firewall must be running at the time that the API calls are made. If the firewall has been shut down, suspended by a user or administrator, or is otherwise not running, then the API calls may not be executed. Unless the administrator or application executing the firewall calls confirms that the firewall is running or confirms that the API calls have been properly executed (perhaps necessitating further API calls), the administrator or application may believe that everything has been handled appropriately and that, for example, firewall rules have been installed correctly. An application seeking to exploit the firewall rules then may fail because the firewall rules are not installed correctly.

In one embodiment of the present invention, setup and configuration responsibilities of a firewall are managed by an operating system (OS) setup component. When a computer service or application is being added to, serviced on, or removed from a computer having an OS that manages firewall setup and configuration responsibilities, it may present to the OS setup component a "component manifest" listing elements of the system to which changes are to be made. The component manifest may be presented to the operating systems setup component in a declarative format describing desired firewall configuration(s) directly, rather than a series of individual instructions to achieve a desired configuration. Thus, fewer firewall API calls may be made by a user/administrator or application. In addition, in one embodiment of the present invention, the operating system setup component may exploit its position as an OS component to store information or request changes to the firewall service when the firewall is not running, and execute on them when the firewall is next started. Thus, firewall manageability may be improved.

Figure 1:
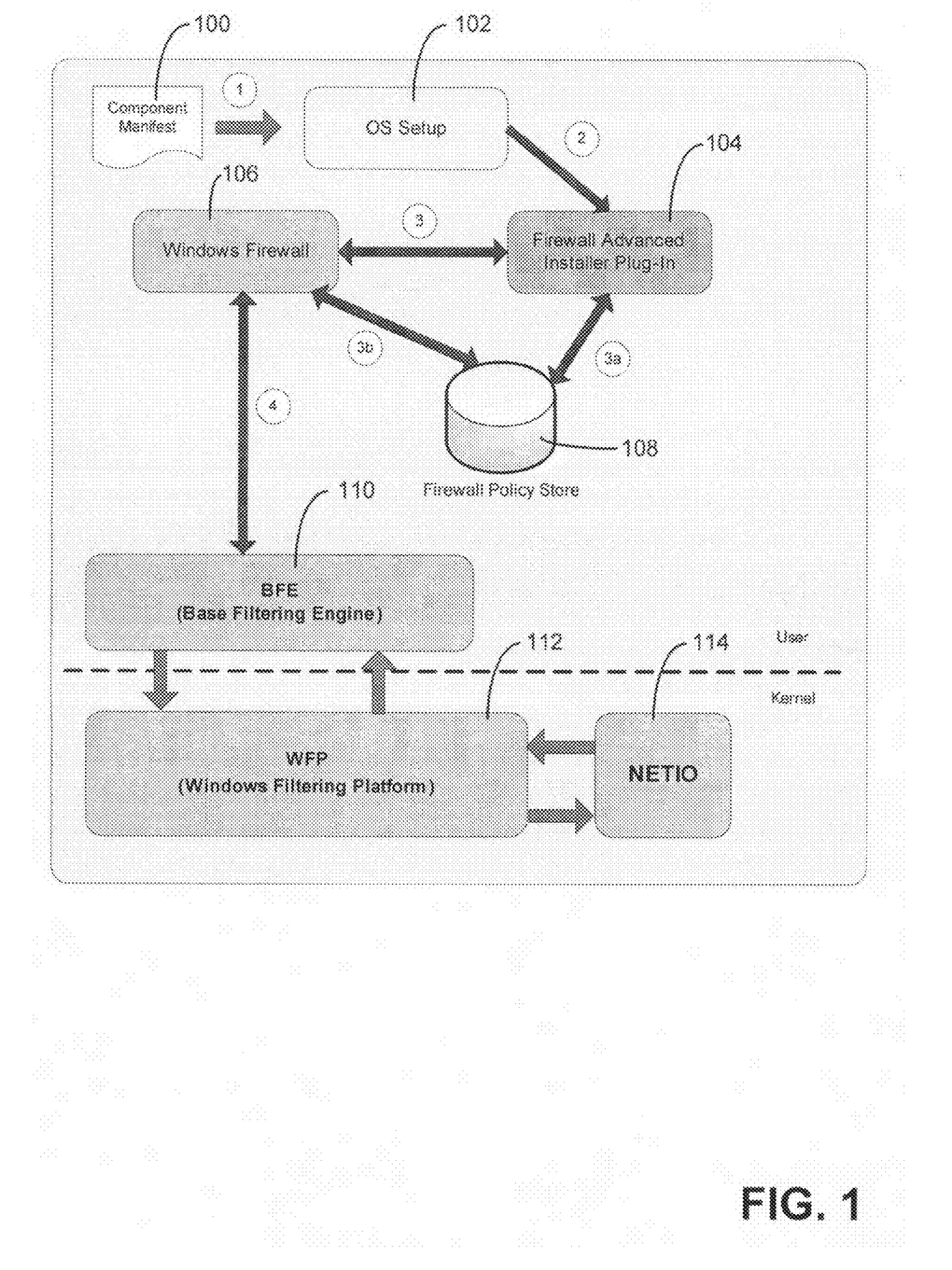
FIG. 1 is a diagram of an illustrative firewall installation system and process in accordance with one embodiment of the present invention.

FIG. 1 is a diagram of an exemplary firewall system and process by which, in one embodiment of the invention, a firewall may be managed. The exemplary computer system of FIG. 1 shows one illustrative embodiment wherein the operating system is a Microsoft Windows operating system available from the Microsoft Corporation of Redmond, Wash. It should be appreciated, however, that embodiments of the invention are not limited to being implemented in computer systems having a Microsoft Windows operating system, and that embodiments of the invention may operate on any suitable operating system, such as the Macintosh operating system from Apple Computer, the Linux operating system, the UNIX operating system, and the Berkeley Software Distribution (BSD) operating system, among others.

In the exemplary computer system of FIG. 1, NETIO 114 performs network input and output operations and may be implemented, for example, as hardware and software drivers. As will be discussed further below, the network(s) with which NETIO 114 interacts may be any suitable wired and/or wireless communication media or medium. In addition to receiving and transmitting information to and from one or more computer networks, NETIO 114 may receive information from and transmit information to a network protocol stack—such as the Windows Filtering Platform (WFP) 112 available from the Microsoft Corporation of Redmond, Wash.—which interacts directly with transmissions as they arrive through engines, such as a Base Filtering Engine (BFE) 110, to determine whether the transmissions meet criteria established by an operating system. The criteria established by the BFE 110 may include firewall rules such as ones stored by firewall 106—which may be implemented as the Windows Firewall available from the Microsoft Corporation of Redmond, Wash.—and created, serviced, or deleted in accordance with embodiments of the present invention.

In step 1 of the illustrative process of FIG. 1, a component manifest 100 is transmitted to an operating system setup module 102. The component manifest 100 may comprise information regarding software to be installed/uninstalled on the computing device hosting the OS setup module 102, as well as configuration changes to be made/unmade to one or more software components of the computing device. The component manifest 100 may be generated in any suitable manner. For example, the component manifest may have been generated as part of an install process for an application or service, or may have been generated as part of an update being made to an application or service already installed on a computer, including as an update to a firewall service. Alternatively, the component manifest 100 may be generated as part of an uninstall process and comprise a listing of changes previously made to the system that should be undone. In the latter embodiment, the component manifest 100 used for an uninstall may be the same component manifest 100 that was used for an install process, but is provided to the OS setup module 102 along with an indicator that the requested changes are rollbacks and not additions.

For computing devices that host firewalls, the configuration changes in the component manifest 100 may comprise firewall rules to be added, serviced, changed or removed from the firewall 106. As discussed above, rather than comprising a series of procedural instructions to be executed to implement a firewall rule in the firewall 106, component manifest 100 may comprise information in a declarative format that, for example, describes a firewall rule to be implemented, rather than the series of instructions necessary to achieve such an implementation. The OS setup module 102 may then process the information in the component manifest 100 in any suitable manner to create, modify or delete a firewall rule, or to make any other desired configuration changes to the firewall 106.

Accordingly, upon receiving the component manifest 100, the OS setup module 102 may read the component manifest and create and/or delegate tasks to be completed by one or more service- or application-specific installers based on the contents of the component manifest 100. Thus, in step 2 of the process of FIG. 1, OS setup module 102 transmits information comprising updates that should be made to the firewall to a firewall advanced installer plug-in 104. This information may comprise firewall rules directly specified in the component manifest 100, firewall rule data created from the information contained in the component manifest 100, and/or any other suitable data. Exemplary structures for the component manifest 100 and the transmission from the OS setup module 102 to the firewall advanced installer plug-in 104 are discussed in greater detail below.

The firewall advanced installer plug-in 104 may make the requested changes to the firewall 106 in any suitable way based on a state of the firewall at the time the transmission from the OS setup module is received at the firewall advanced installer plug-in 104. If the firewall is installed, running and active, in one embodiment of the invention the firewall advanced installer plug-in 104 may determine one or more firewall API function calls that can be made to implement the requested firewall configuration actions described by the component manifest 100. Once the firewall API function calls are determined by the firewall advanced installer plug-in 104, the firewall advanced installer plug-in 104 may make the function calls in step 3 of FIG. 1 and put the changes into effect. These changes may then be processed by the firewall 106 and appropriate function calls may be made and appropriate information passed to the BFE 110 in step 4 to implement the corresponding firewall filters in the WFP 112.

Alternatively, if the firewall 106 is not running or is otherwise inactive, in some embodiments of the invention the firewall advanced installer plug-in may update directly the firewall policy store 108 in step 3a to reflect the new firewall implementation specified in the transmission from the OS setup module. These updates may be made in any suitable manner, and how the changes are made may depend on how the firewall policy store 108 is structured. For example, if the firewall policy 108 is in a protected operating system file such as a Microsoft Windows registry, access to the firewall policy 108 may be limited to operating system components. Accordingly, in one embodiment of the invention, the firewall advanced installer plug-in 104 may be implemented as an operating system component and may make these updates via private operating system function calls to which it has access. In another embodiment of the invention, if the firewall policy store 108 is a flat file storing firewall rules in a minimal structure such as an Extensible Markup Language (XML) structure, the firewall advanced installer plug-in 104 may make the changes to the firewall policy store 108 directly via public functions. In a further embodiment, the firewall advanced installer plug-in may make function calls to a service storing the firewall rules in the case where firewall policy store 108 is a structured data set such as a database managed by a database service. In yet a further alternative embodiment, the firewall advanced installer plug-in may be able to start a service that manages the firewall 106 in an inactive or semi-active state such that the firewall 106 will process API calls it receives and will make requested changes to its firewall policy store 108, but will not enforce the new, modified, or existing firewall rules until it is started in a normal execution mode. It should be appreciated the above embodiments are merely examples and that embodiments of the invention are not limited to storing firewall rules in any specific manner, as a firewall policy store 108 can be implemented in any way.

Once the changes are made to the firewall policy store 108 in step 3*a*, the changes may become active when the firewall 106 is next activated and the firewall policies stored by the firewall policy store 108 loaded into the firewall 106 in step 3*b*. The firewall may then load the firewall rules into the BFE 110 in step 4 as discussed above.

It should be appreciated that embodiments of the invention are not limited to a system having the architecture shown in FIG. 1 nor to implementing the illustrative process shown in FIG. 1. For example, in one embodiment of the invention, the component manifest 100 may be presented directly to the firewall advanced installer plug-in 104, rather than being relayed by the OS setup module 102. Also, as discussed above, embodiments of the invention may not execute processes by which updates to firewall 106 are made when the firewall 106 is inactive. Alternatively, in one embodiment of the invention, changes requested by the component manifest 100 may always be made through updates of the firewall policy store 108, whether the firewall 106 is active or not.

Additionally, it should be appreciated that embodiments of the invention may not implement a firewall installer as a plug-in to an OS module, but may instead, in embodiments of the invention, be implemented as a stand-alone component operating in conjunction with the OS module. In alternative embodiments of the invention, the firewall installer may be implemented as the OS module or as part of the OS module, and may not be a separate component. It should be appreciated that these alternative embodiments are merely exemplary, and embodiments of the invention may implement a firewall installer in any suitable manner.

It should be further appreciated that embodiments of the invention are not limited to acting in the exemplary computer system shown in FIG. 1. For example, the firewall 106 may, in some embodiments of the invention, interact directly with the NETIO 114 as the network protocol stack rather than interacting with a filtering engine 112 such as the Windows Filtering Platform.

Figure 2:
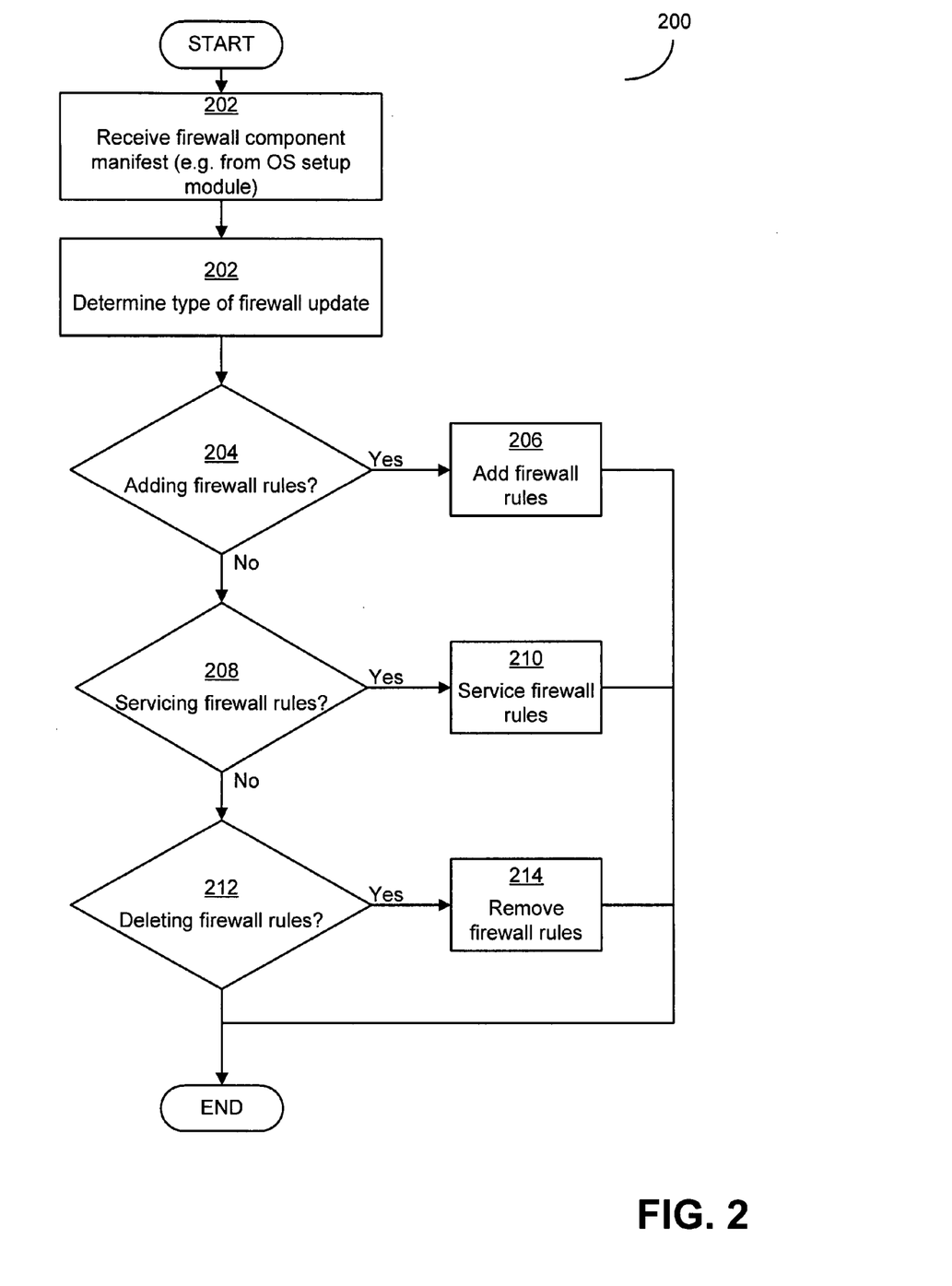
FIG. 2 is a flowchart of an illustrative process for determining what type of update is being made to a firewall, in accordance with one embodiment of the invention.

FIG. 2 shows process 200 by which a firewall installer may process received information to update a firewall. In the illustrative system of FIG. 2, the process 200 may be implemented by the firewall advanced installer plug-in 104 which may process firewall-related information contained in a component manifest 100 received from the OS setup module 102 to determine how to update the firewall 106. However, it should be appreciated that the process 200 is not limited in this respect and may be executed on other types of systems.

The process starts with block 202, wherein the firewall advanced installer plug-in 104 receives the component manifest 100. In block 202, the process 200 determines what type of firewall update is being requested by the component manifest 100. Any type of firewall update may be requested, but firewall updates may generally be separated into three categories: pure addition of firewall rules, pure deletion of firewall rules, and servicing of firewall rules (which may comprise adding rules, deleting rules, and/or modifying existing rules). This determination of block 202 may be made in any suitable manner. In one embodiment of the invention, component manifest 100 may comprise an indicator of what type of update is being requested, and process 200 may examine the indicator to determine the update type. In an alternative embodiment of the invention, block 202 may comprise comparing information about firewall rules contained in the component manifest 100 to information about firewall rules managed by the firewall 106. For example, a firewall rule may include a unique name, and the firewall advanced installer plug-in 104 may examine the firewall rules managed by the firewall 106 to determine whether an existing firewall rule has the same name. Alternatively or additionally, a set of firewall rules may be linked together by a common group value or group name, and firewall advanced installer plug-in 104 may examine the firewall 106 to determine whether it is already managing a group of firewall rules having that group value or group name. It should be appreciated that these techniques are merely exemplary, and any suitable process may be used to determine the type of firewall update requested.

In block 204, if the component manifest is only requesting that firewall rules be added, then process flow continues to block 206 wherein the firewall rules described by component manifest 100 are added otherwise the process flow continues to block 208. If servicing of firewall rules is requested, then block 208 sends process flow to block 210 wherein firewall rules are serviced. If servicing is not requested, process flow continues to block 212. If it determines that component manifest 100 contains rules that should be deleted in block 212, the process proceeds to block 214 to remove firewall rules.

Exemplary processes that may be executed by embodiments of the invention for adding, sending and deleting firewall rules (e.g., as processes of blocks 206, 210, and 214) are now described in further detail. It should be appreciated that these processes are merely illustrative and that numerous other implementations are possible.

Figure 3:
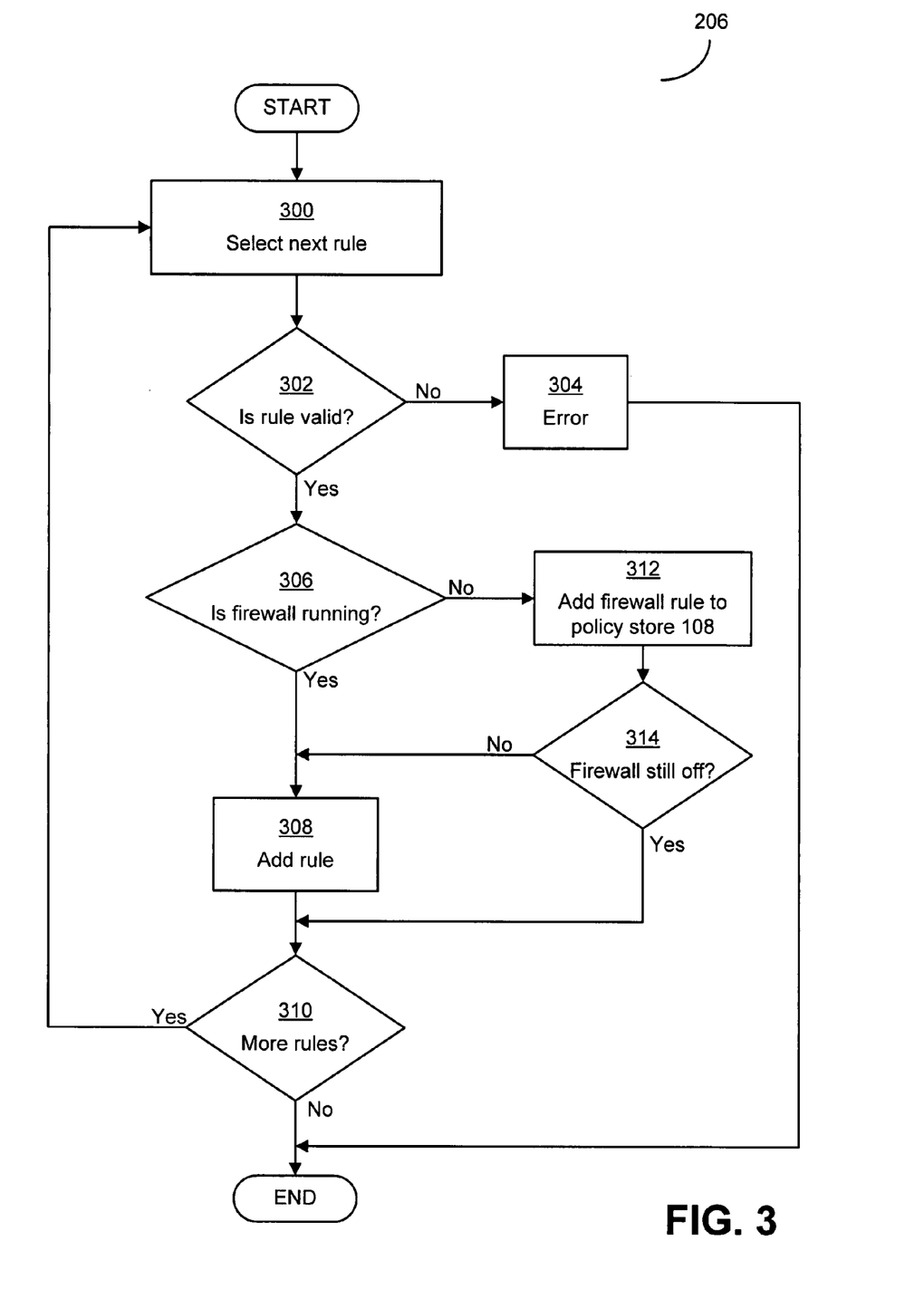
FIG. 3 is a flowchart of an illustrative process for adding firewall rules to a firewall, in accordance with one embodiment of the invention.

FIG. 3 shows an exemplary process 206 for adding rules to a firewall 106. Process 206 begins in block 300, at which point descriptions of the firewall rules which are to be added to the firewall 106 have been received. In block 300, the process begins by selecting one of the firewall rules contained in component manifest 100 for processing. For the selected rule, the process first determines (block 302) whether the rule is valid. This determination may be done in any suitable manner, and may, for example, determine whether the firewall rule contains invalid options or settings, and/or whether the options or settings conflict with existing rules or other options or settings within the new rule. If the rule is determined to be invalid, then in block 304 the firewall advanced installer plug-in 104 may generate an error to be provided to a user, OS setup module 102, and/or any other suitable recipient, and then the process may terminate.

If the rule is determined to be valid in block 302, the process proceeds to block 306 wherein the process (e.g., via the firewall advanced installer plug-in 104 or otherwise) may determine whether the firewall is running. This may be done in any suitable manner, such as by examining a list of applications or services executing on a host computing device, or by making a firewall API call and listening for a response (e.g., an error indicating that the service not started/available).

If it is determined that the firewall is running, the process proceeds to act 308 wherein the process (e.g., via the firewall advanced installer plug-in 104 or otherwise) may update the firewall 106 to add the rule in any suitable manner. For example, the firewall advanced installer plug-in 104 may examine the information regarding the firewall rule to be added and may determine one or more firewall API calls that can be made to implement the firewall rule. Exemplary firewall API calls may include a firewall API call to add a blank or limited firewall rule followed by firewall API calls to add various parameters contained in the information regarding the firewall rule to the newly-created blank or limited firewall rule.

If it is determined that the firewall is not running at act 306, the process (e.g., via the firewall advanced installer plug-in 104) may proceed to act 312 to edit a firewall policy store 108 in block 310 to add the new rule in a manner similar to that described in block 308. By directly editing the firewall policy store 108, the changes to the firewall 106 may be made while the firewall is inactive, and these changes may be executed on by the firewall 106 along with other policy information stored in firewall policy store 108 when the firewall is next started. The firewall rules created while the firewall 106 was inactive, then, may be enforced along with existing rules. As discussed above, this may be done in any suitable manner, and the manner in which it is done may be dependent on how the firewall policy store 108 is structured.

For example, if the firewall rules are stored in a protected operating system file such as the Windows Registry in the system of FIG. 2, the firewall advanced installer plug-in 104 may make a series of private operating system function calls to make changes to the registry. In some embodiments of the invention, these private operating system function calls may be similar to the firewall API calls described above, which define a new firewall rule iteratively based on the information contained in the component manifest 100. In some embodiments of the invention, the private operating system function calls may be similar to the firewall API calls, while in other embodiments of the invention the operating system function calls may implement the firewall rule using other types (e.g., more or less) of function calls.

Alternatively, if the firewall rules are stored in a publicly-accessible file, the firewall rule may be added (e.g., by the firewall advanced installer plug-in 104) through one or more public write functions. For example, the firewall advanced installer plug-in 104 may be able to manipulate the information about the firewall rule contained in the component manifest 100 into a format in which it will be stored in firewall policy store 108, and may be able to write the information to the firewall policy store 108 in a single operation.

After the firewall rule has been added to the firewall policy store 108 in block 312, the process 206 proceeds to block 314 to determine whether the firewall is still inactive or shutdown. If the firewall is still off, then execution continues to block 310 which is described below. If the firewall has been turned on since it was first determined to be off in block 306, then the firewall rule, while in the firewall policy store 108, may not be being enforced by the firewall 106 because it may not have been fully implemented when the firewall 106 was turned on or activated. Therefore, in one embodiment of the invention, the process 206 proceeds to block 308 to update the firewall rule (in any of the ways discussed above) to ensure that the firewall rule is correctly implemented and enforced. In an alternative embodiment of the invention, rather than executing block 308 if the firewall is determined to be on at block 314, the process 206 may instead proceed to a different block (not shown) wherein the firewall 106 is restarted such that it loads and enforces the new firewall rule fully. In a further alternative embodiment of the invention, rather than executing block 308 if the firewall is determined to be on at block 314, the process 206 may make one or more firewall API calls to force the firewall 106 to update the firewall rules it is enforcing with the firewall rules stored in the firewall policy store 108. In another alternative implementation, embodiments of the invention may implement a firewall 106 that is capable of receiving notifications from its firewall policy store 108 indicating that changes have been made to the firewall policy store 108 while the firewall 106 was running. The firewall 106 may then reload its firewall rules or may restart. In this embodiment, the firewall policy store 108 may be stored in a protected operating system file such as the Windows Registry of Microsoft Windows available from the Microsoft Corporation of Redmond, Wash., and the operating system may inform the firewall 106 that the Registry has been edited. It should be appreciated that these alternative embodiments are merely exemplary, and embodiments of the invention may implement any suitable process for ensuring that firewall rules are correctly loaded and enforced by a firewall.

Once the firewall rule is put in place in block 308 or when it is determined that the firewall is off in block 314, in block 310 the process (e.g., in firewall advanced installer plug-in 104 or otherwise) determines whether the component manifest 100 contains more rules that need to be evaluated and added to the firewall 106. If there are, the process returns to block 300 to select the next rule for processing. In this manner the process 206 processes all of the rules until it determines in act 310 that there are not more rules to be added, and then ends.

Figure 4:
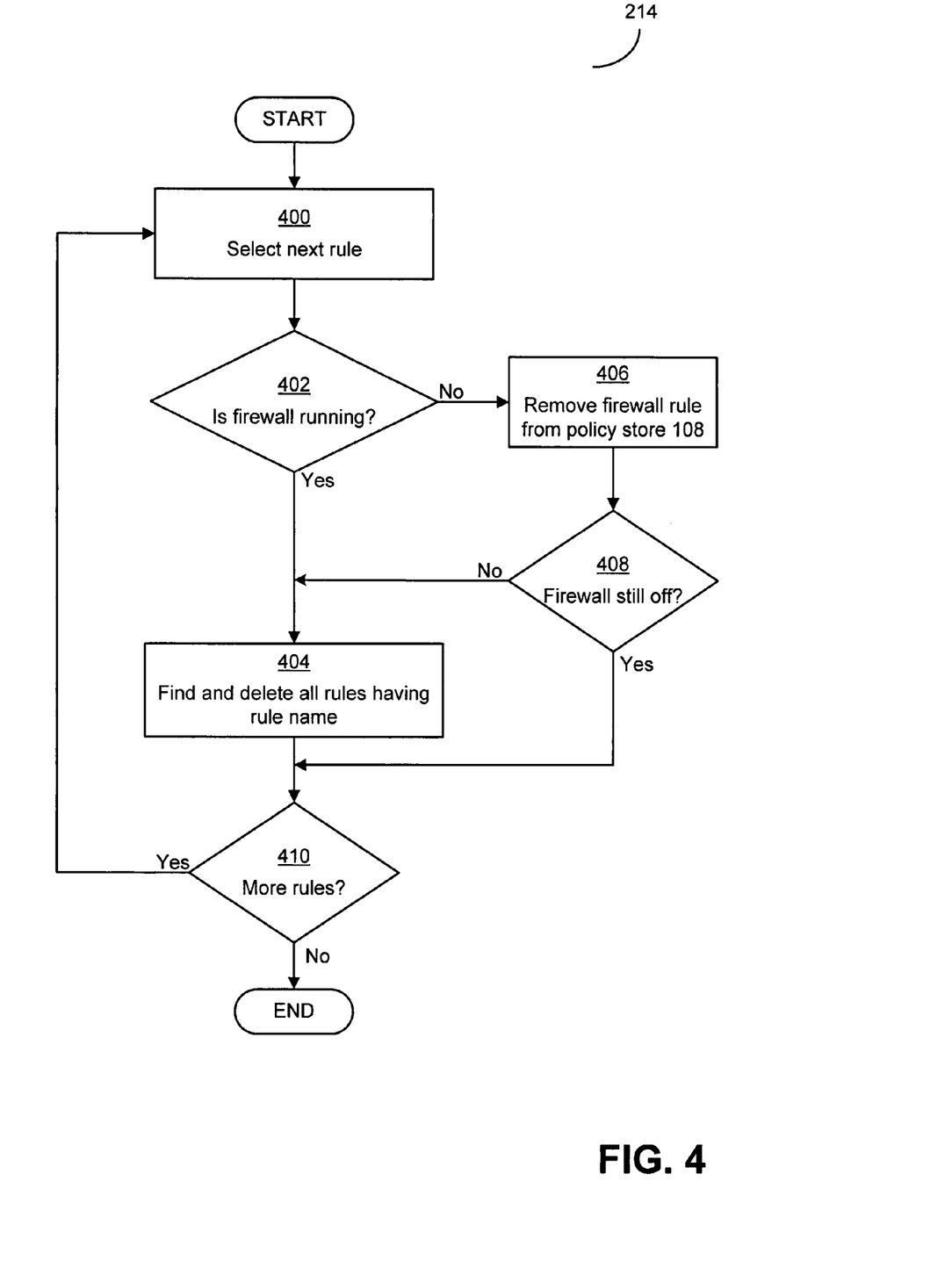
FIG. 4 is a flowchart of an illustrative process for deleting firewalls rules from a firewall, in accordance with one embodiment of the invention.

FIG. 4 shows an exemplary process 214 by which firewall rules may be removed from the system. Process 214 begins by selecting a firewall rule from the list of firewall rules to remove. In block 402, the process (e.g., via firewall advanced installer plug-in 104 or otherwise) determines whether the firewall 106 is running and active. If so, the process proceeds to block 404 wherein it queries the firewall 106 for all rules having the same name as the firewall rule to be removed. It should be appreciated that there may be multiple rules having the same name because each rule may be for a different environment or profile, as will be discussed in greater detail below. The querying may be done using firewall API calls, by examining firewall policy store 108, or in any other suitable way. Once this list of firewall rules is retrieved, the rules may be deleted in any suitable way. For example, when there are multiple rules they may be deleted with successive firewall API calls, one per rule, or by making a firewall API call to delete all of them at once. In an alternative embodiment of the invention, the process (e.g., firewall advanced installer plug-in 104) may provide the name of the firewall rule to the firewall 106 via a single firewall API call, and the firewall 106 may delete the firewall rules that match that name.

If in block 402 it is determined that the firewall is not running, then in block 406 the processing (e.g., via firewall advanced installer plug-in 104) removes the firewall rules contained in the component manifest 100 directly from the firewall policy store 108. By directly editing the firewall policy store 108, the changes to the firewall 106 may be made while the firewall is inactive, and these changes may be executed on by the firewall 106 along with other policy information stored in firewall policy store 108 when the firewall is next started. The firewall rules removed while the firewall 106 was inactive, then, may not be enforced when the firewall 106 is activated. As discussed above in conjunction with FIG. 3, updates to the policy store 108 may be done in any suitable manner and may depend on how the firewall policy store 108 is structured. Once the firewall rules have been removed from the firewall policy store 108 in block 406, the process (e.g., via firewall advanced installer plug-in) may determine in block 408 whether the firewall 106 is still not running. Again, as discussed above in conjunction with FIG. 3, modifying the firewall policy store 108 may create a race condition that may lead to firewall rules being removed but still enforced, depending on when the firewall 106 was turned on/activated. Thus, in one embodiment if the process at block 408 determines that the firewall is not still off, then the process proceeds to block 404 where firewall rules may be removed in the manner described above.

Once the firewall rules are removed in block 404 or block it is determined in block 408 that the firewall is off, the process 214 continues to block 410, wherein it determines if there are more rules that need to be evaluated and removed from the firewall 106. If it determines that there are, the process returns to block 400 to select the next rule. If there are not more rules to be added, then the process 214 ends.

It should be appreciated that all embodiments of the invention are not limited to implementing the exemplary process shown in FIG. 4. For example, in one embodiment of the invention, firewall rules may additionally or alternatively be removed based on a firewall rule group name, instead of just on the firewall rule name. As will be discussed in further detail below, in some embodiments of the invention a firewall may comprise groups of firewall rules. Firewall rules may be grouped together based on a particular application with which the firewall rules are associated, or may be grouped together in any other suitable fashion. Thus, in one embodiment of the invention, the component manifest 100 may comprise an indicator of a group of firewall rules that are to be removed, and the process (e.g., via the firewall advanced installer plug-in 104 or otherwise) may determine all of the rules that belong to the group (e.g., by making a firewall API call to retrieve all firewall rules matching that firewall group name) and may then remove each of them. Alternatively, the process may provide the group name to the firewall 106 via a firewall API call and the firewall 106 may remove all firewall rules having that group name.

Figure 5:
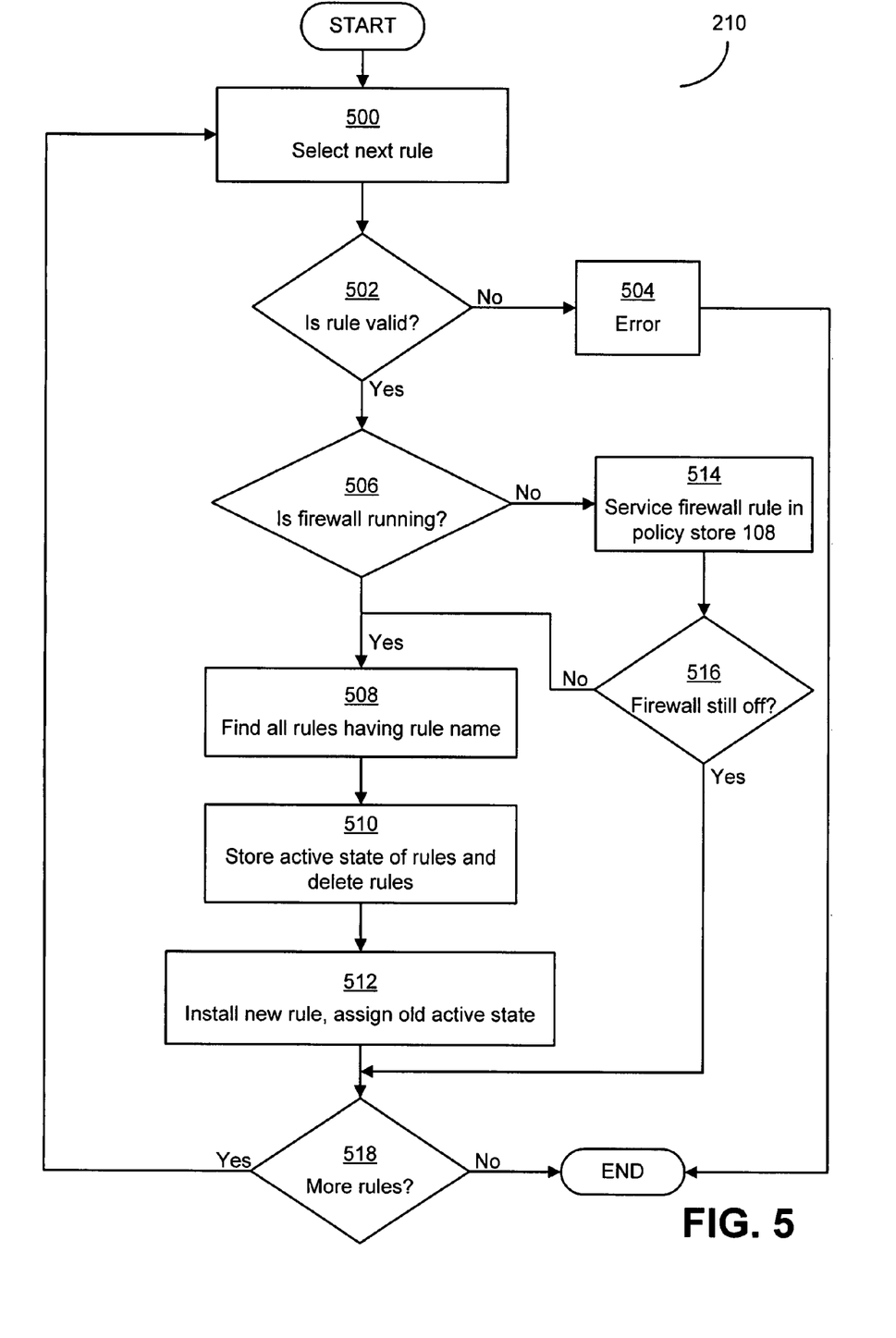
FIG. 5 is a flowchart of an illustrative process for editing firewall rules in a firewall, in accordance with one embodiment of the invention.

FIG. 5 shows an exemplary process 210 by which firewall rules may be serviced/modified, e.g., by the firewall advanced installer plug-in 104, in the illustrative system of FIG. 2. The process 210 begins in block 500, wherein the first rule to be processed is selected. In some embodiments of the invention, the selected rule is first examined for validity in block 502. This determination may be done in any suitable manner, and may, for example, comprise determining whether the firewall rule contains invalid options or settings, and/or determining whether options or settings conflict with existing rules or other options or settings within the new rule. If the process determines that the rule is invalid, it proceeds to block 504 wherein the process (e.g., via the firewall advanced installer plug-in 104 or otherwise) may generate an error to be provided to a user, OS setup module 102, and/or any other suitable recipient, and then terminates.

When the process determines that the rule is valid, it proceeds to block 506 wherein a determination is made as to whether the firewall is running. If the firewall is running, then in block 508 the process finds all firewall rules having the same name as the selected firewall rule. As discussed above, this may be done in any suitable manner, one example of which includes querying the firewall 106 with a firewall API call.

The process then proceeds to block 510, wherein the process reads through the list of rules returned in block 508 and stores in temporary storage the active state of each firewall rule (e.g., active or inactive) before deleting the firewall rules. The deletion may be done in any suitable manner, such as by any of the processes described above in conjunction with FIG. 4. Once the firewall rules are deleted, the process proceeds to block 512, wherein the new firewall rules contained in the component manifest 100 are added. Once the new firewall rules are installed, the active state of each of the old firewall rules is retrieved from the temporary storage and assigned to the corresponding new rule. In this way, the active state of the firewall may be preserved during servicing of firewall rules. It should be appreciated that adding rules in the process of block 512 may be done in any suitable manner, including by any of the processes discussed above in conjunction with FIG. 3 (e.g., a series of firewall API calls).

If it is determined in block 506 that the firewall is not running, the process proceeds to block 514, wherein the edit firewall rules are serviced directly by editing them in a firewall policy store 108. As with the process of blocks 508-512, the process of block 514 may comprise determining which existing firewall rules have the same name as a firewall rule to be serviced, storing the active state of those firewall rules, adding the new rule, and assigning to the new rule the active state of the existing firewall rules. By directly editing the firewall policy store 108, the changes to the firewall 106 may be made while the firewall is inactive, and these changes may be executed on by the firewall 106 along with other policy information stored in firewall policy store 108 when the firewall is next started. The firewall rules serviced while the firewall 106 was inactive, then, may be enforced along with existing rules. As discussed above, editing the firewall policy store 108 may be done in any suitable manner, and the manner in which it is done may depend on how the firewall policy store 108 is structured. For example, if it is a protected operating system file, then the process (e.g., via firewall advanced installer plug-in 104 or otherwise) may execute private operating system function calls to edit the protected operating system file. Once the firewall rules are edited as laid out in the component manifest 100, the process 210 proceeds to block 516 to determine whether the firewall 106 is still off. If the firewall 106 is not still inactive, the process 200 proceeds to block 508 to make the updates to the firewall rules that it had made in block 514 because there is a race condition regarding when the firewall was turned on and at what point in the update process block 514 was. The updates may be made in any suitable manner, for example, by proceeding to block 508 and executing blocks 508, 510, and 512.

Once the firewall rules have been edited in blocks 508-512 or it is determined at block 516 that the firewall is still off, process 210 proceeds to block 518. Block 518 determines whether there are more rules in component manifest 100 that need to be evaluated. If it is determined that there are more firewall rules, then the process returns to block 500, wherein the next firewall rule is selected and the process is repeated for that rule. If there are no more firewall rules to evaluate, then the process 210 ends.

It should be appreciated that embodiments of the invention are not limited to implementing the exemplary process of FIG. 5. For example, in one embodiment of the invention, existing firewall rules may be edited to update the firewall rules according to the component manifest 100 rather than deleting the existing rules and installing new ones.

It should also be appreciated that in some embodiments of the invention, the process 210 of FIG. 5 may also comprise additional steps regarding adding and removing rules as part of an update process. For example, an update that may be applied to the firewall 106 by process 210 may comprise adding rules as well as updating existing rules. Toward that end, process 210 may comprise additional steps to add and remove rules, such as the steps executed by processes 206 and 214 discussed above, or steps that execute any suitable process.

Figure 6:
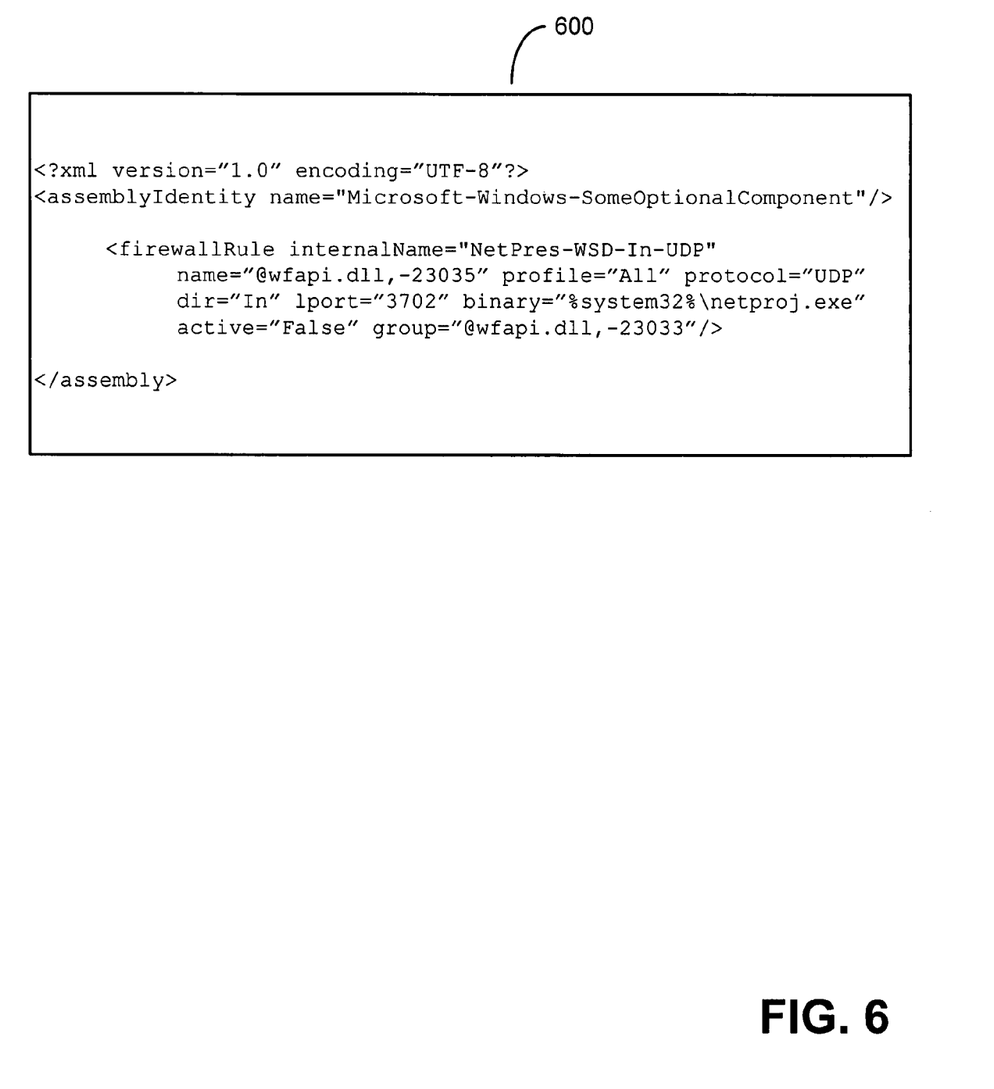
FIG. 6 is a flowchart of an illustrative process for updating a firewall when the firewall is not running, in accordance with one embodiment of the invention.

For some embodiments, firewall rules such as those stored by component manifest 100 may be formatted in any suitable manner. However, one embodiment of the invention is directed to a schema such as the one shown in FIG. 6. FIG. 6 shows a data structure 600 comprising a number of data fields and values that may be used in a firewall rule such as those maintained by firewall 106. It should be appreciated that a firewall rule may comprise any number of required and/or optional data fields, and that firewall rules maintained by some embodiments of the invention are not limited to implementing any of the data fields shown in FIG. 6.

The exemplary format shown in FIG. 6 is an Extensible Markup Language (XML) structure. The parent node of the XML structure is the assemblyIdentity XML node in which at least one instruction may be stored in a declarative and XML-compliant format. As discussed above, the instructions may include firewall rules to be added to, removed from, or serviced on the system. In the exemplary format of FIG. 6, each firewall rule is contained within a firewallRule XML node. Each firewallRule node has a plurality of data fields specifying parameters for the firewall rule contained within the node.

The data fields in FIG. 6 may include any parameters on which the firewall 106 can make its decision to allow or block data. For example, a firewall rule may be enabled or disabled by a firewall administrator, and thus the firewall rule may comprise an ACTIVE field storing a "True" or "False" value. The firewall rule may also store a name for itself (the NAME field) so that it may be distinguished to a user or administrator. The name field may take a definite value, or may take an indefinite value such as a reference to a text value in a dynamic linked library, such in FIG. 6. This latter approach may be taken in cases where different text values may be used in different circumstances, such as in different geographical locations where different languages may be used. By referencing the text instead of storing the text directly, the firewall rule may be more readily adapted to implementation in different circumstances. The firewall rule, in addition to having a NAME field, may have an INTERNALNAME field to store a unique name that may be used by the firewall 106 in referring to the rule in internal processes, such as the processes of FIGS. 3-5. The INTERNALNAME field may store any suitable string of text.

The firewall rule may also comprise one or more filtering parameters. In FIG. 1, a DIR field is provided that enables a firewall rule to store an indicator of what type of traffic it applies to, i.e., inbound and/or outbound (i.e., into the computer or computer network protected by the firewall or out of the computer or computer network). A firewall rule may further comprise an indicator of what protocol or protocols it operates on (the PROTOCOL field), stored in any suitable way such as by the number assigned to the protocol by the Internet Assigned Numbers Authority (IANA). In FIG. 6, the PROTOCOL field has a value of 6, which corresponds to the Transmission Control Protocol (TCP) according to the IANA numbering scheme. The local port used by the data may also be regulated by the firewall 106 (the LPORT field). This may be used to limit the type of data being transmitted, because certain types of data typically are transmitted over certain ports, and may also serve to limit the number of ports open on the computer or computer network. The LPORT field may take any appropriate value (e.g., TCP ports are numbered from 0 to 65535), including keywords for port numbers (e.g., "HTTP" for port 80). A firewall rule may comprise an indicator of what service may send or receive the data (the SVC field), which may comprise a name for the service (e.g., XYZService), or a particular application that is sending or receiving the data (the BINARY field) with a full or relative path to the application's executable (e.g., %system32%\netproj.exe).

A firewall rule may have a PROFILE field indicating to which computing profile it applies. A computing profile may be set by a user or an operating system to indicate an environment that the computer apparatus is in, so that network policies such as firewall and IPsec policies, or other network settings, may be set appropriately. In this manner, some firewall rules may only be applied to some environments/profiles. The PROFILE field may take any suitable value, including "Domain," which may indicate that the computer apparatus is in a managed network domain, "Private," which may indicate that the computer apparatus is in a private network such as a home network, and "Public," which may indicate that the computer apparatus is in a public network such as a commercial network (e.g., in a coffeehouse). A firewall may also store a GROUP indicator, which may link together two or more firewall rules that relate to a particular experience or feature on the computer apparatus (e.g., an application). In this manner, all firewall rules relating to a particular experience or feature on the computer apparatus may be simultaneously enabled or disabled when referred to as a group, or other suitable group operations may be performed on the firewall rules. As with the NAME field, the GROUP field may store a direct text value or may store an indirect text value as a reference.

Firewall rules may also store other data fields and other values not shown in FIG. 6. In one embodiment illustrated in Table I, a number of additional data fields may be specified. Table I provides descriptions of those fields, as well as an indication of whether those fields are required or optional in a firewallRule node, possible values the data fields may store, and default values the data fields may store, is shown in Table I.

TABLE I

Exemplary firewall rule data fields for a firewallRule node

| Attribute | Description | Required/ Optional | Possible Values | Default Value (if optional) |
|---|---|---|---|---|
| InternalName | InternalName utilized by Firewall APIs internally | Required | String (1-255 characters) | N/A |
| Name | Name displayed in Firewall user interface | Required | String (1-255) | N/A |
| Desc | Description of rule displayed in firewall user interface | Required | String (0-1024) | Omit |
| Profile | The environments in which to activate the rule | Optional | "Domain", "Private", "Public", "All", "*", "Domain, Private" | "All" |
| Action | The action the enforcement engine should take for this rule | Required | "Allow", "Block" | "Allow" |
| Active | Specifies whether or not the rule is active or not | Required | "True", "False" | |
| Dir | Traffic direction that the rule applies | Required | "In", "Out" | N/A |
| Protocol | The protocol(s) to which this rule applies | Optional | Keywords (e.g., "TCP", "UDP") or Internet Assigned Numbers Authority (IANA) number | 1 (ICMP4) or 58 (ICMP6) |
| ICMP4 | If Protocol = 1 then ICMP4 specifies the Internet Control Message Protocol (ICMP) and code for error handling to which the rule applies | Optional | Integer:Integer | Omit |
| ICMP6 | If Protocol = 58 then ICMP6 specifies the ICMP protocol and code for error handling to which the rule applies | Optional | Integer:Integer | Omit |
| LPort | The local port to which this rule applies | Optional | Integer, Keyword | Omit |
| RPort | The remote port to which this rule applies | Optional | Integer | Omit |
| Binary | The executable application binary or service binary to which this rule applies | Optional | String | Omit |
| Svc | The name of the service to which this rule applies | Optional | String | Omit |
| RA4 | This specifies the remote Internet Protocol version 4 (IPv4) address scope to which the rule applies | Optional | String | Omit |
| RA6 | This specifies the remote Internet Protocol version 6 (IPv6) address scope to which the rule applies | Optional | String | Omit |
| Edge | This specifies whether or not Edge Traversal should be enabled for your exception (allows unsolicited IPv6 traffic using the Teredo protocol) | Optional | "True", "False" | "False" |
| Group | This specifies the name of the group of which the rule is a member | Optional | String | Omit |

It should be appreciated that firewall rules may comprise any number and any combination of required and optional parameters. Thus, although one embodiment has the fields illustrated by Table I, all embodiments are not limited to firewall rules implementing these or any other particular data field or data fields, including those that are required for the embodiment of Table I.

Figure 7:
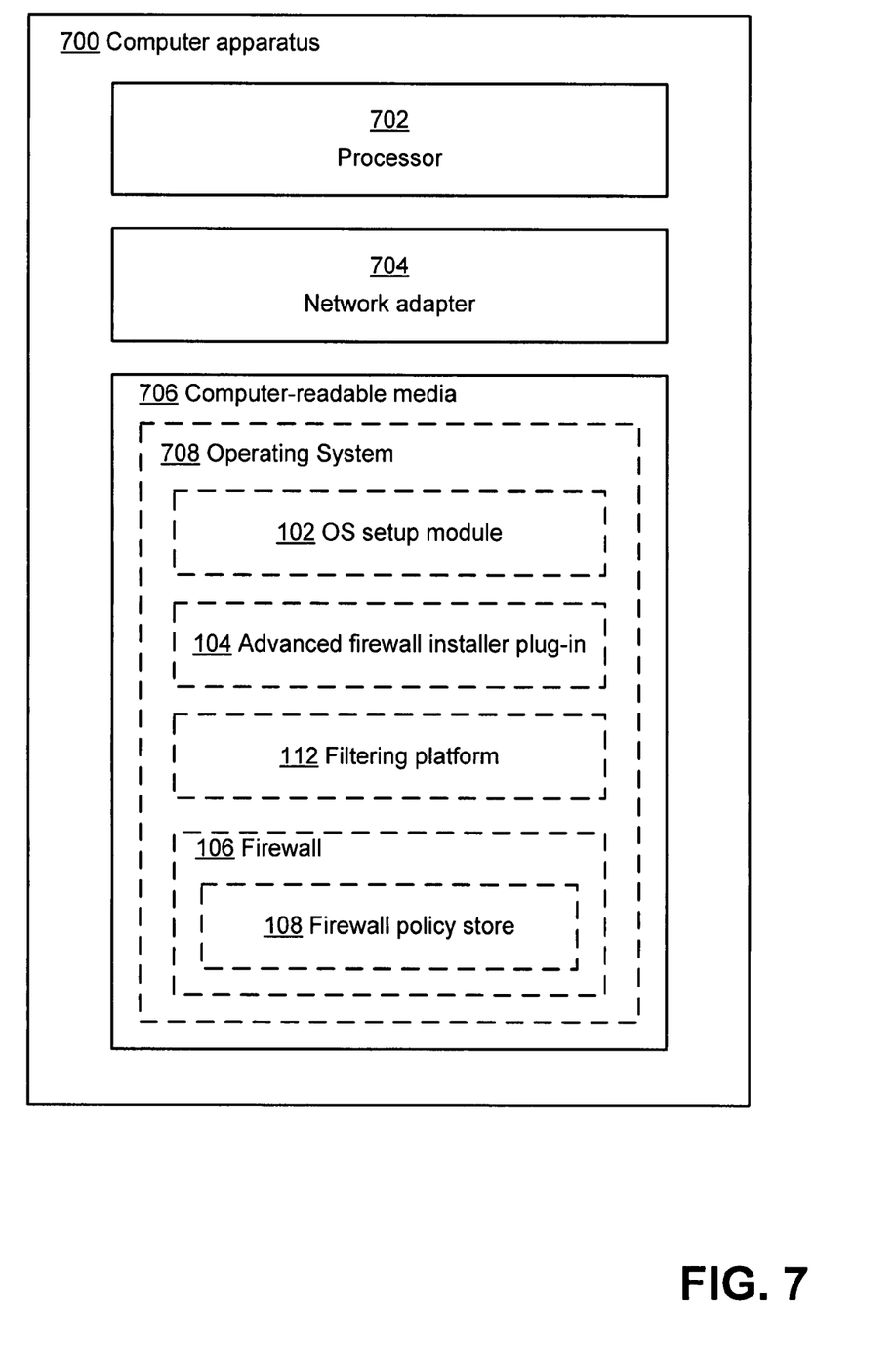
FIG. 7 is an exemplary computer apparatus that may be used in accordance with one embodiment of the present invention.
Figure 8A:
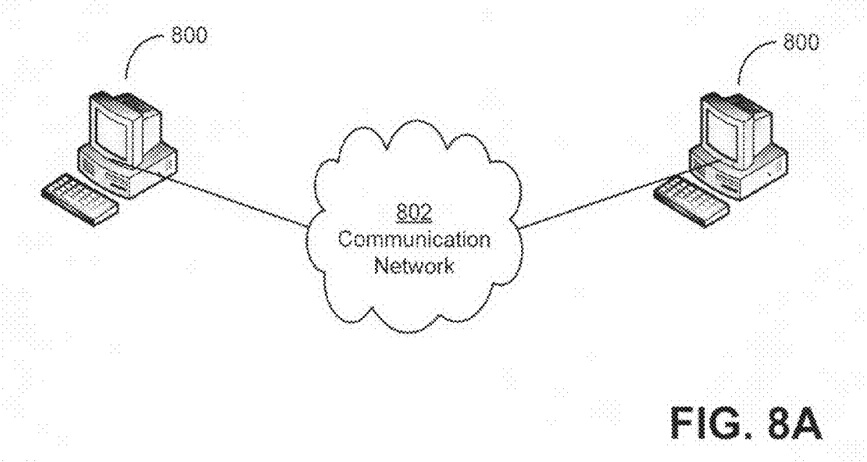
FIG. 8A is an exemplary computer system on which embodiments of the invention may be implemented.
Figure 8B:
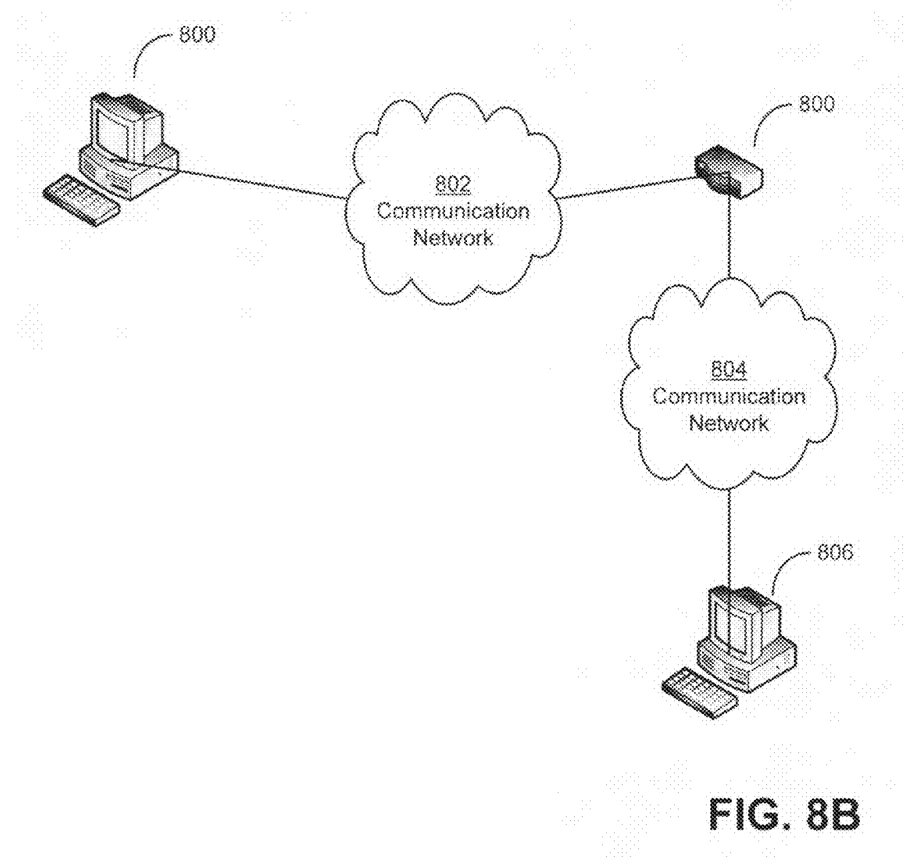
FIG. 8B is an alternative exemplary computer system on which embodiments of the invention may be implemented.

The aspects of the present invention described herein may be implemented on any of numerous computer system configurations and are not limited to any particular type of configuration. FIGS. 7-8 show various computer systems in which embodiments of the invention may act, though others are possible.

FIG. 7 shows a computer apparatus 700 which may host firewall 106 and that may be used in accordance with one or more embodiments of the invention. It should be appreciated that FIG. 7 is intended to be neither a depiction of necessary components for a computing device to operate as a computer apparatus with embodiments of the invention, nor a comprehensive depiction. As discussed above, any suitable computing device may be used as a computer apparatus 700 to host a firewall 106. Computer apparatus 700 may be a computing device designed for multiple purposes and for use by a user, such as a desktop personal computer, a laptop personal computer, a server, a personal digital assistant (PDA), a smart/mobile telephone, or any other suitable electronic device. Alternatively, computer apparatus 700 may be any computing device not intended for typical use by a user or intended for a single purpose or limited purposes, such as a server, a rack-mounted networking device, or a standalone networking device such as a switch, hub, router, access point, hardware firewall, or any other suitable electronic device.

As shown in FIG. 7, computer apparatus 700 comprises a processor 702, a network adapter 704, and computer-readable media 706. Network adapter 704 may be any suitable hardware and/or software to enable computer apparatus 700 to communicate with any other suitable computing device over any suitable computing network. The computing network may be any suitable wired and/or wireless communication medium or media for exchanging data between two or more computers, including the Internet. Computer-readable media 706 may be adapted to store data to be processed and/or instructions to be executed by processor 702. Processor 702 enables processing of data and execution of instructions. The data and instructions may be stored on the computer-readable media 706 and may, for example, enable communication between components of the computer apparatus 700.

In accordance with some embodiments of the invention, the data and instructions stored on computer-readable media 706 may comprise an operating system (OS) 708. The OS 708 may then comprise an OS setup module 102 adapted to work with an advanced firewall installer plug-in 104. OS 708 may further comprise a firewall 106, a firewall policy store 108, and a filtering platform 112.

While firewall 106 is shown in FIG. 7 as part of the OS 708, it should be appreciated that in some embodiments of the invention, the firewall 106 (comprising a firewall policy store 108) may be one or more standalone applications that interact with the operating system 708 and may not be a component of the operating system 708.

It should be appreciated that in some embodiments of the invention, such as those wherein computer apparatus 700 is implemented as a single purpose or limited purpose device, computer apparatus 700 may not implement all features of the exemplary computer apparatus 700 shown in FIG. 7. For example, in some embodiments of the invention, computer apparatus 700 may not comprise an operating system 708. Rather, computer apparatus 700 may be communicably linked to another computing device having an operating system and an advanced firewall installer plug-in 104, and adapted to process a component manifest 100 to perform remotely updates to a firewall 106 hosted by a computer apparatus 700.

Computer apparatus 700 may be disposed with a computer system and connected to a computer network. FIG. 8A shows one exemplary computer system in which embodiments of the invention may act, though others are possible. In FIG. 8A, computer apparatus 700 is connected to a communication network 802. As discussed above, communication network 802 may be any suitable wired and/or wireless communication medium or media for exchanging data between two or more computers, including the Internet. In FIG. 8A, computer apparatus 700 is connected to remote computer 106 through communication network 802. In the embodiment of FIG. 8A, remote computer 800 may be communicating directly with computer apparatus 700. Computer apparatus 700 is, therefore, a terminal point of the connection, and firewall 106 may only be securing computer apparatus 700 and not any other computing devices in the network. When data received from remote computer 800 is received and approved, then, it may be provided directly to a process or application on computer apparatus 700 and not relayed to another device over a network. Similarly, outbound data being sent from computer apparatus 700 to remote computer 800 through the firewall 106 may be received directly from a process or application and not over a network from another device.

Alternatively, computer apparatus 700, as discussed above, may be a single-purpose or limited-purpose device disposed within a computer network protecting multiple computers. Such an embodiment is shown in FIG. 8B. In FIG. 8B, computer apparatus 700 is a stand-alone device such as a switch, hub, router, access point, hardware firewall, or other suitable electronic device. Computer apparatus 700, as in FIG. 8A, may be connected to remote computer 800 through a communication network 802, but may also be connected to a communication network 804, which may be a local network. Just as communication network 802, communication network 804 may be any suitable wired and/or wireless communication medium or media for exchanging data between two or more computers, including the Internet. Computing device 806 may be connected to communication network 804, and may be being protected by firewall 106 on computer apparatus 700. In this manner, for computing device 806 to send or receive data from certain computers, the data must be examined by firewall 106 on computer apparatus 700 before it is relayed to either computing device 806, in the case of inbound data, or another computer such as remote computer 800, in the case of outbound data.

It should be appreciated that embodiments of the invention are not limited to operating in the exemplary computer systems shown in FIGS. 8A and 8B, and that embodiments of the invention may be implemented in any suitable computer system. Additionally, though remote computer 800 and computer apparatus 700 are shown in FIG. 8A as desktop computers, and remote computer 800 and computing device 806 are shown in FIG. 8B as desktop computers, these computing devices may be implemented as any suitable computing device, including a desktop personal computer, a laptop personal computer, a server, a personal digital assistant (PDA), a smart/mobile telephone, a web-enabled television set, or any other suitable electronic device.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface including keyboards, and pointing devices, such as mice, touch pads, and digitizing tables. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system comprising:
a firewall installer to configure a firewall, the firewall installer comprising at least one processor programmed to:
(A) receive, at the firewall installer, a set of configuration instructions comprising at least one configuration instruction, the set of configuration instructions being in a declarative form that specifies at least one firewall rule to be enforced by the firewall without specifying procedural steps to be carried out to configure the firewall to implement the at least one firewall rule; and
(B) in response to receipt of the set of configuration instructions in the declarative form, modify a firewall policy of the firewall, via the firewall installer, such that the firewall implements the at least one firewall rule, wherein modifying the firewall policy comprises:
(B1) determining whether the firewall is in operation,
(B2) when it is determined that the firewall is in operation, communicating with the firewall to modify the firewall policy according to the set of configuration instructions, and
(B3) when it is determined that the firewall is not in operation, making at least one edit to a data store comprising the firewall policy.

2. The system of claim 1, wherein (B) further comprises:
identifying, based on the set of configuration instructions, a plurality of procedural steps not directly specified in the set of configuration instructions to be carried out to modify the firewall policy to implement the at least one firewall rule; and executing the plurality of procedural steps.

3. The system of claim 1, wherein (B) comprises executing a plurality of procedural steps in an order that is not specified via the set of configuration instructions.

4. The system of claim 1, wherein the firewall installer is located remotely from a computing device hosting the firewall.

5. The system of claim 1, wherein the set of configuration instructions comprises an indicator of at least one parameter of the firewall rule.

6. A method of configuring a firewall via a firewall installer, the method comprising an act of:
- (A) operating at least one processor to manage at least one software component based on information specifying changes to be made to a configuration of a computing device regarding the at least one software component, wherein managing the at least one software component comprises:
  - (A1) changing a configuration of the at least one software component on the computing device based at least in part on the information specifying the changes to be made to the configuration of the computing device, the at least one software component not being a part of the firewall or the firewall installer, and
  - (A2) providing to the firewall installer a set of configuration instructions comprising at least one configuration instruction, the set of configuration instructions being identified by the information specifying the changes to be made to the configuration of the computing device and being in a declarative form that specifies a modification to be made to a firewall policy of the firewall such that at least one firewall rule is enforced by the firewall, the set of configuration instructions in declarative form specifying the modification without specifying procedural steps to be carried out to configure the firewall to implement the at least one firewall rule.

7. The method of claim 6, wherein the firewall installer executes a plurality of procedural steps to configure the at least one firewall rule based on the set of configuration instructions, and wherein the act (A) comprises providing a set of configuration instructions that does not directly specify the plurality of procedural steps.

8. The method of claim 6, wherein the firewall installer executes a plurality of procedural steps in an order to configure the at least one firewall rule based on the set of configuration instructions, and wherein the act (A) comprises providing a set of configuration instructions that does not directly specify the order in the set of configuration instructions.

9. The method of claim 6, wherein the set of configuration instructions comprises an indicator of at least one parameter of the firewall rule.

10. The method of claim 6, wherein the set of configuration instructions is an XML schema.

11. The method of claim 6, wherein the act (A) of managing the at least one software component comprises providing the set of configuration instructions as part of installing the at least one software component on the computing device.

12. The method of claim 6, wherein the act (A) of managing the at least one software component comprises providing the set of configuration instructions as part of uninstalling the at least one software component on the computing device.

13. At least one computer-readable storage medium encoded with instructions that, when executed by at least one computer, cause the at least one computer to perform a method, the method comprising acts of:
- (A) receiving, at a firewall installer, a set of configuration instructions comprising at least one configuration instruction, the set of configuration instructions being in a declarative form that specifies at least one firewall rule to be enforced by a firewall without specifying procedural steps to be carried out to configure the firewall to implement the at least one firewall rule; and
- (B) in response to receipt of the set of configuration instructions in the declarative form, modifying a firewall policy of the firewall, via the firewall installer, such that the firewall implements the at least one firewall rule, wherein modifying the firewall policy comprises
  - (B1) determining whether the firewall is in operation,
  - (B2) when it is determined that the firewall is in operation, communicating with the firewall to request that the firewall modify the firewall policy according to the set of configuration instructions, and
  - (B3) when it is determined that the firewall is not in operation, making at least one edit to a data store comprising the firewall policy without requesting that the firewall make the at least one edit.

14. The at least one computer-readable storage medium of claim 13, wherein (B) comprises executing a plurality of procedural steps that are not directly specified via the configuration instructions.

15. The at least one computer-readable storage medium of claim 13, wherein (B) comprises executing a plurality of procedural steps in an order that is not specified via the configuration instructions.

16. The at least one computer-readable storage medium of claim 13, wherein the set of configuration instructions comprises an indicator of at least one parameter of the firewall rule.

17. The at least one computer-readable storage medium of claim 13, wherein (B3) comprises editing at least one file of a file system based on the set of configuration instructions when the firewall is not in operation.

18. The system of claim 1, wherein the at least one processor is programmed to modify the firewall policy by making at least one change to a firewall rule.

* * * * *